United States Patent [19]
Ferraro

[11] 3,710,133
[45] Jan. 9, 1973

[54] SYNCHRONIZATION OF STATIC INVERTERS

[75] Inventor: Ralph J. Ferraro, Piscataway, N.J.
[73] Assignee: Ward Leonard Electric Co., Inc.
[22] Filed: Sept. 9, 1970
[21] Appl. No.: 70,718

[52] U.S. Cl..................................307/66, 307/232
[51] Int. Cl................................................H02j 7/00
[58] Field of Search..........321/4; 307/19, 23, 29, 64, 307/66, 87, 232, 235; 318/6

[56] References Cited

UNITED STATES PATENTS

| | | |
|---|---|---|
| 2,594,801 | 4/1952 | Rees.........................................321/10 |
| 3,614,461 | 10/1971 | Speer.......................................307/64 |
| 3,348,060 | 10/1967 | Jamieson.................................307/66 |
| 3,229,111 | 1/1966 | Schumacher et al................307/66 X |
| 3,564,275 | 2/1971 | Eberle......................................307/29 |

Primary Examiner—William H. Beha, Jr.
Attorney—Bernard Malina

[57] ABSTRACT

A system for synchronizing the static inverter enables the phasing of the output from a static inverter in correspondence to an alternate power supply. The synchronized system compares the static inverter output with the alternate power source in a phase detector which outputs an error correcting signal which is used to adjust the static inverter master clock.

9 Claims, 3 Drawing Figures

SYNCHRONIZATION OF STATIC INVERTERS

BACKGROUND OF THE INVENTION

It is sometimes desirable to bring a static inverter into service or take one out of service either for repair or to utilize an alternate power source. In the process of introducing an alternate power source to replace the static inverter or vice versa consideration must be given to the frequencies of the two alternating currents. A difference in frequency between two power sources coupled together can result in a single signal which has the appearance of being amplitude modulated due to the power sources change phase relationship from in phase to out of phase. The presence of this modulation can seriously affect the operation of equipment such as a computer or certain types of synchronized motors. In order to eliminate the occurrence of a difference in the oscillating frequencies between the two power sources, a means of synchronization is necessary.

SUMMARY OF THE INVENTION

This invention provides a system for comparing the output of a static inverter to an alternate power source and thereby derive a correction signal which can be used to adjust the master clock of the static inverter.

It is the object of the present invention to provide a system for synchronizing static inverters.

Another object of this invention is to provide a signal for adjusting the master clock of a static inverter.

A further object of this invention is to provide an economical system for synchronizing a static inverter with lumped constant components.

Other and further objects of this invention will be obvious upon the understanding of the illustrative embodiment about to be described or will be indicated in the apended claims and various advantages not referred to herein will occur to one skilled in the art upon employment of the invention in practice.

BRIEF DESCRIPTION OF THE DRAWINGS

A preferred embodiment of the invention has been chosen for purposes of illustration and description and it is shown in the accompanied drawing forming a part of the specification wherein:

FIG. 1 illustrates a block diagram of a typical static inverter used in the prior art. The object of a static inverter is to convert a direct current (D.C.) source into an alternating current (A.C.) source for driving equipment adapted for an A.C. source. A portion of the D.C. source supplies the power needed to operate the static inverter while the remainder is converted into an A.C. output.

Figure 1:
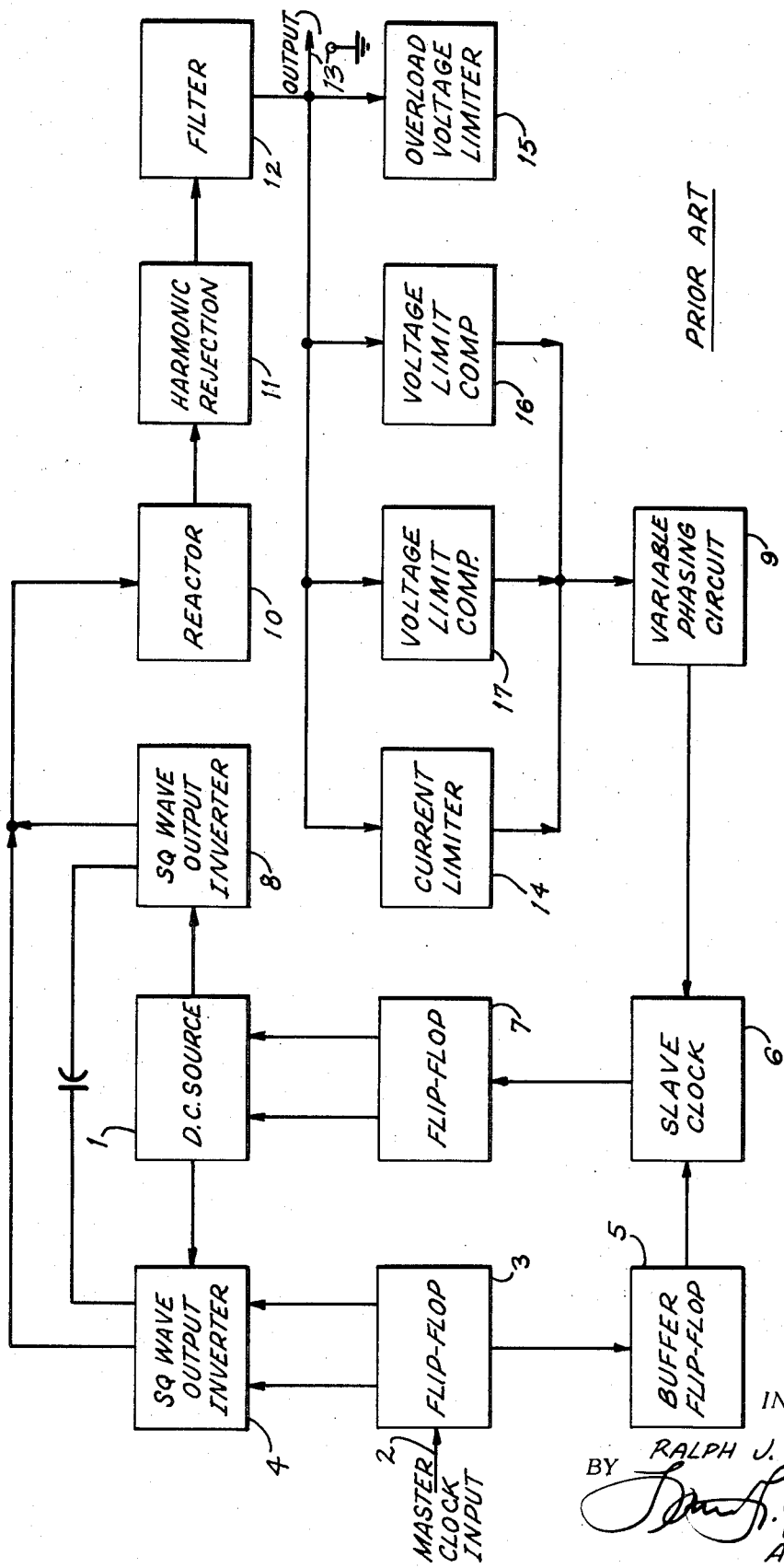
FIG. 1 is a block diagram of a typical static inverter used in the prior art.

The operation of the static inverter is as follows:

Master clock input 2 drives flip-flop 3. Flip-flop 3 is connected to a square wave output inverter 4 which essentially generates half of the signal needed to obtain the desired A.C. output. Flip-flop 3 is also coupled to buffer flip-flop 5 which is used to drive the slave clock 6. Slave clock 6 drives flip-flop 7 which is coupled over to square wave output inverter 8. Square wave output inverter 8 essentially generates the other half of the desired A.C. output signal. Slave clock 6 is coupled into from variable phasing circuit 9 which provides compensation for the phase between the output of square wave output inverters 4 and 8.

The outputs from square wave output inverters 4 and 8 are applied to reactor 10 and then to harmonic suppressor 11 and then to filter 12. The output signal at terminals 13 are monitored by current limiter 14 overload voltage limiter 15, voltage limit compensator 16, and voltage limit compensator 17. The voltage limit compensators 16 and 17 sample the peak and valley voltage limits of the output voltage and provide information to the variable phasing circuit 9 so that the generated square waves from inverters 4 and 8 are symmetrical.

Figure 2:
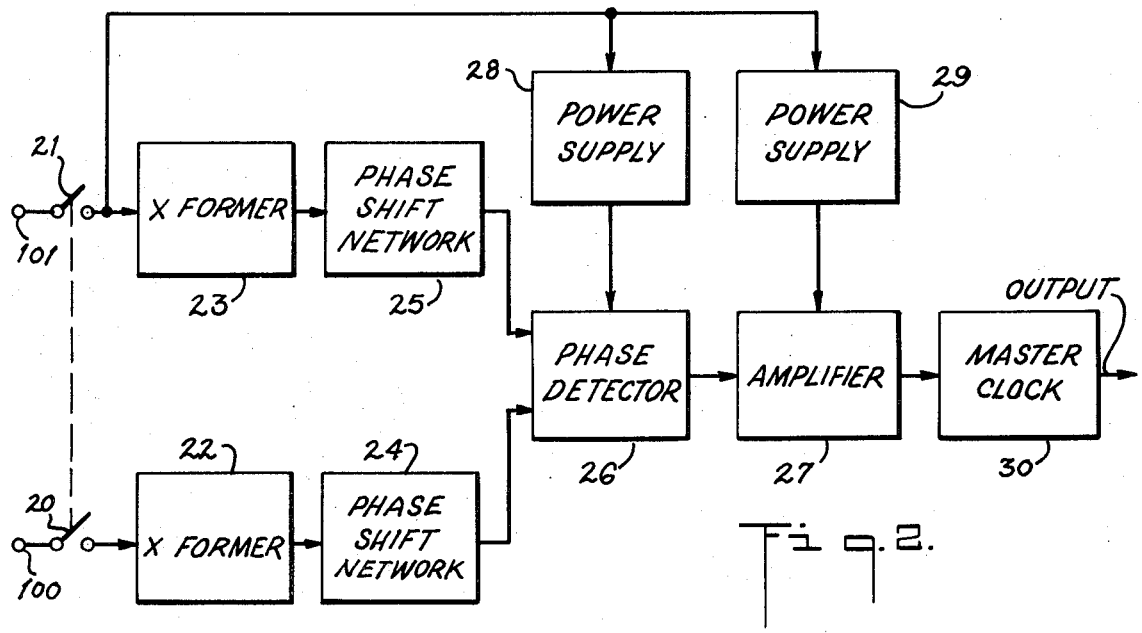
FIG. 2 is a block diagram of the preferred embodiment of the invention.

FIG. 2 illustrates the preferred embodiment of the invention. The static inverter which is to be synchronized is inputted on line 100 while the alternate or parallel power source inputs on line 101. Switches 20 and 21 which are mechanically coupled are closed in order to bring about the synchronization between the static inverter source in use and the alternate source to be used. Transformer 22 is used to step down the voltage of the static inverter source while transformer 23 is used to step down the alternate source. Phase shift networks 24 and 25 are used to correct the phase relationship between the static inverter source and alternate source respectively so as to make the two inputs compatible with phase detector 26. Phase detector 26 and amplifier 27 receive direct current (D.C.) from power supplies 28 and 29 respectively. Power supplies 28 and 29 receive their inputs from the alternate power source.

The inputs from phase shift networks 24 and 25 are compared in phase detector 26. The output from phase detector 26 is a signal which is proportional to the phase difference between the two inputs. This output signal is applied amplifier 27 where it is amplified and then outputs to a voltage tunable master clock 30. Master clock is used to supply a master clock 30 input to a static inverter such as the type illustrated in FIG. 1. In addition, the output from master clock 30 can be used for a three phase static inverter. The output from master clock 30 which is applied to flip-flop 3 of the static inverter shown in FIG. 1, changes the frequency of the outputs of inverters 4 and 8, which, in turn, produces a change in frequency at transformer 22. The sense of this change in frequency at transformer 22, is such as to minimize the amplitude of the output of phase-difference detector 26. Hence, the frequencies between the static inverter and the alternate power source will become synchronized.

Figure 3:
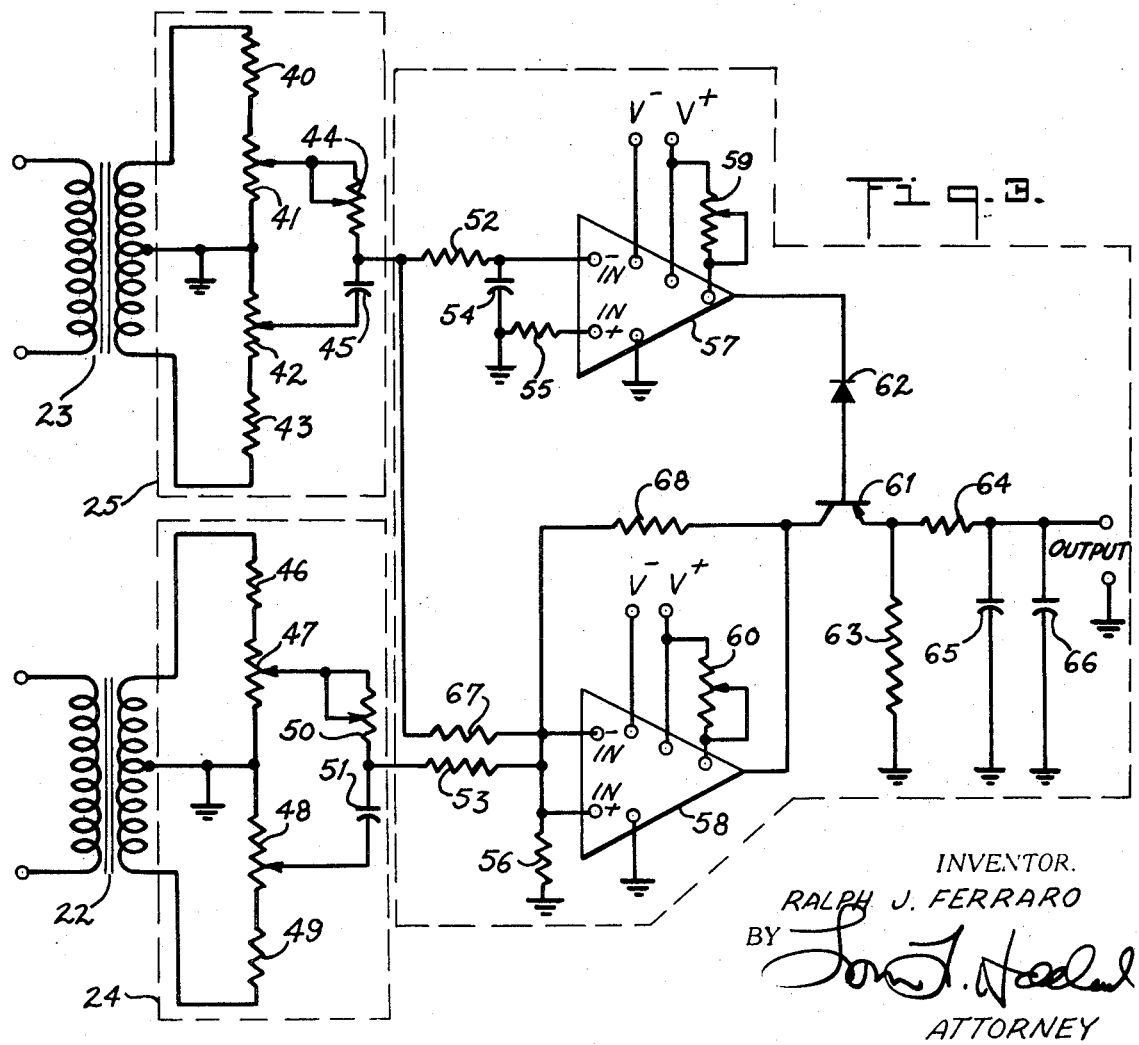
FIG. 3 is a circuit diagram for the phase shift network and phase detector circuit of the preferred embodiment of the invention.

FIG. 3 is a circuit diagram for phase shift networks 24 and 25 and phase detector 26. Phase shift networks 24 and 25 are essentially similar. Resistors 40, 41, 42 and 43 which are across the output of transformer 23 form a voltage divider network. Similarly, resistors 46, 47, 48 and 49 form a voltage divider for the output through transformer 22. Resistors 41, 42, 47 and 48 are adjustable in order to balance the outputs from transformers 23 and 22.

Resistor 44 and capacitor 45 form the phase shift control for phase shift network 25 while resistor 50 and capacitor 51 form the phase shift control for phase shift network 24. The output from phase shift network 25 is coupled through resistor 52 to operational amplifier 57. Similarly, phase shift network 24 is coupled to operational amplifier 58.

Functionally, operational amplifier 57 applies switching pulses to the base of a transistor 61 while operational amplifier 58 acts as a differential amplifier receiving input signals from both the static inverter source and the alternate power source. Resistor 52 and capacitor 54 produce a phase lag of 90° with respect to the input signal from the alternate power source. Resistors 55 and 67 are used to increase the input impedance to operational amplifier 58. The feedback resistor 68 with resistor 67 determines the gain of operational amplifier 58. Resistor 56 provides a bias and resistors 59 and 60 are balance adjustments to set operational amplifiers 57 and 58 for a zero output. The supply voltages $V^-$ and $V^+$ come from power supply 28.

Diode 62 is used to block positive going output from operational amplifier 57 to protect transistor 61 from excessive reverse voltages. Resistor 63 is the load resistor for transistor 61. The network consisting of resistor 64 and capacitors 65 and 66 form an integrator. The output voltage is the integral of the voltage present at the output of operational amplifier 58 during the period of each cycle that transistor 61 is switched on. The output voltage will zero, i.e., being phase of the phase of the swing around a positive voltage, the output voltage being greater when the phase of the static inverter source lags the phase of the alternate power source and being less if the static inverter source leads. The output is applied to amplifier 27. Because of a translation in voltage between power supplies 28 and 29, the output of amplifier 27 swings plus and minus around zero of the control voltage for master clock 30.

Amplifier 27 is of a conventional design is operative to amplify and match the output impedance of phase detector 26 to the input impedance master clock 30. Master clock 30 is a conventional voltage tunable oscillator whose output frequency is a function of its D.C. input voltage.

As various changes may be made in the form of construction and arrangement of the parts herein without departing from the spirit and scope of the invention and without sacrificing any of its advantages it is to be understood that all matter herein is to be interpreted as illustrative and not in a limiting sense.

Having thus described my invention, I claim:

1. An apparatus for synchronizing the output frequency of a static inverter with the output frequency of an alternate power source comprising phase detector means for deriving a correction voltage corresponding to the phase difference between said static inverter output and said alternate power source signal output, means for coupling a signal from said static inverter output and a signal from said alternate power source output to said phase detector means, means for sampling said correction voltage to produce a correction voltage signal, means for coupling said integrated sample correction voltage to a voltage tunable master clock and means for coupling said voltage tunable master clock to said static inverter for controlling the output frequency of said static inverter.

2. An apparatus as claimed in claim 1 including means for coupling a signal from said static inverter and a signal from said alternate power comprising first and second phase shift networks for said static inverter and said alternate power source signals respectively.

3. An apparatus as claimed in claim 2 wherein the means for coupling a signal from said static inverter and a signal from said alternate power source comprises first and second transformers.

4. An apparatus as claimed in claim 1 wherein the phase detector means comprises first and second operational amplifiers.

5. An apparatus as claimed in claim 3 wherein the phase detector means comprises first and second operational amplifiers.

6. An apparatus as claimed in claim 1 wherein the means for sampling said correction voltage comprises a transistor.

7. An apparatus as claimed in claim 5 wherein the means for sampling said correction voltage comprises a transistor.

8. An apparatus as claimed in claim 1 wherein the means for integrating said sample correction voltage comprises a resistor and a capacitor.

9. An apparatus as claimed in claim 7 wherein the means for integrating said sample correction voltage comprises a resistor and a capacitor.

* * * * *